Figure 1:
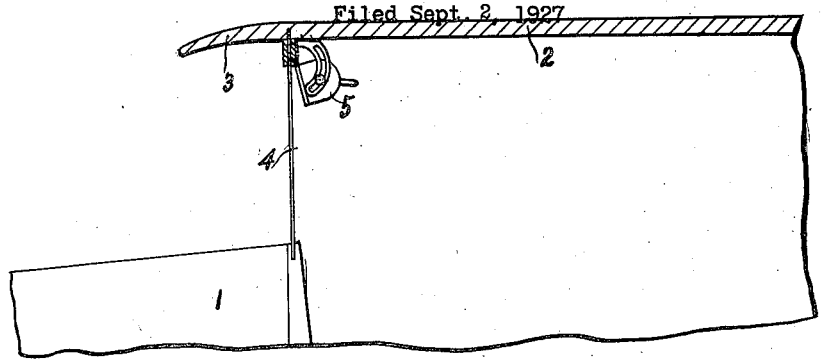

June 19, 1928. 1,674,340

A. B. NOCK

WINDSHIELD HEADLIGHT

Filed Sept. 2, 1927

INVENTOR.
Arthur B. Nock
BY Fay, Oberlin & Fay
ATTORNEYS.

Patented June 19, 1928.

1,674,340

UNITED STATES PATENT OFFICE.

ARTHUR B. NOCK, OF CLEVELAND, OHIO.

WINDSHIELD HEADLIGHT.

Application filed September 2, 1927. Serial No. 217,086.

This invention, as indicates, relates to a windshield headlight. More particularly it comprises headlight apparatus adapted to be disposed adjacent to or in the plane of the windshield. It preferably would be located within the car, but in some instances it would be desirable to mount the same in advance of or in direct line with the windshield.

The elevated position of the headlight is also shown in U. S. Patent No. 1,541,376, issued to the applicant on June 9, 1925, wherein the headlight is embodied in the visor structure of the automobile.

The present invention is adapted for vehicles wherein the visor is a forward extension of the roof line of the car or for use in trucks or commercial vehicles wherein no visor of any character is provided. The elevated position of the device provides for a greater angle of the light rays toward the road surface and in that way serves to prevent the projecting rays from blinding the occupants of vehicles approaching from the opposite direction.

The illuminating device may take various forms but preferably would involve the use of a plurality of headlights closely associated centrally of the vehicle and affording broad non-glare beams so aligned as to operate substantially as a single unit. The reflector units preferably should be united in close juxtaposition and positioned centrally above the windshield of a motor car. When installed on trucks or commercial vehicles, the space on either side of the illuminating device may be closed by means of panels which extend to the outer edge of the windshield and upwardly toward the inner surface of the roof.

The principal object of the present invention is to provide an improved headlight apparatus for illuminating the roadway to be traversed, such apparatus being positioned at an elevated point so that the angular relation of the beam to the roadway is greater than that where the headlights are positioned at the usual place adjacent the radiator of the motor car. Another object of the invention is to provide a headlight unit of superior efficiency and one within easy control of the operator of the car so that adjustment may be readily made in accordance with the inclination of the roadway traversed. Other and further objects of the invention will appear in the course of the following description.

To the accomplishment of the foregoing and related ends, said invention, then, consists of the means hereinafter fully described and particularly pointed out in the claim, the annexed drawing and the following description setting forth in detail certain mechanism embodying the invention, such disclosed means constituting, however, but one of various mechanical forms in which the principle of the invention may be used.

In said annexed drawing:—

Figure 4:
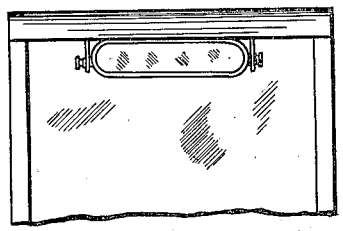
Figure 5:
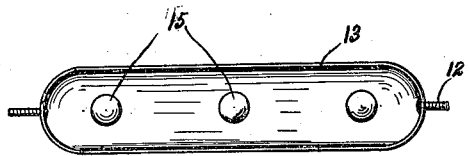
Figure 3:
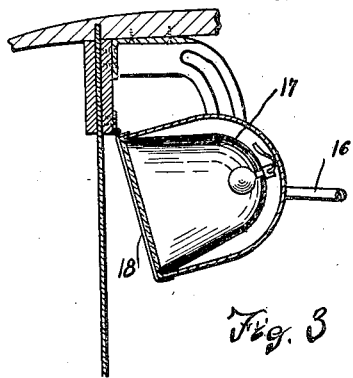
Figure 2:
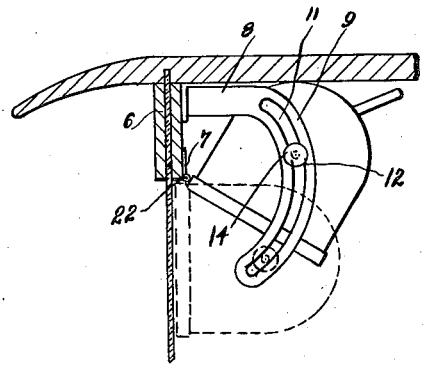
Figure 6:
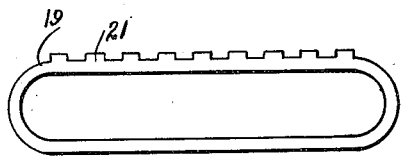

Fig. 1 is a diagrammatic elevation, partly in section, illustrating the position of the headlight upon the body of the motor car; Fig. 2 is an enlarged detail view showing the lighting mechanism in side elevation; Fig. 3 is a central vertical sectional view of the lighting apparatus shown in Fig. 2; Fig. 4 is a front elevation of the device shown in Fig. 1; Fig. 5 is a front elevation of the reflector casing and lighting unit; and Fig. 6 is a front elevation of the front frame of the reflector casing.

As will appear from the drawings, the motor car 1 having a roof 2 with an extension 3 projecting in advance of the windshield 4 is provided adjacent the upper portion of said windshield with a lighting unit 5. Said lighting unit, as will more readily appear from Figs. 2 and 3, is supported upon a panel 6 extending across the car adjacent the upper edge of the windshield by means of hinge members 7, secured to the inner surface thereof. Adjustment brackets 8 are provided adjacent each side of the lighting unit and have downwardly projecting sections 9 formed with arcuate slots 11 within which pins 12, formed at each end of a reflector casing 13, are engaged. Adjusting nuts 14 are provided with suitable washers engaged upon the screw-threaded ends of said pins so as to lock the reflector in any desired position within the slots of the brackets. The reflector may be of any desired size, but as shown is substantially one-half the width of the windshield and is provided with three illuminating bulbs 15. At the rear of said casing an adjusting handle 16 is provided and the degree of frictional engagement of the nuts and washers with the brackets may be so regulated that the operator of the car, without leaving his seat, may swing the lighting unit to any desired radial position of adjustment without changing the adjustment of said nuts. Within the reflector casing the reflector 17 is positioned, said reflector having the proper parabolic or other form found most desirable for projecting the light rays. A suitable lens 18, preferably adapted to distribute a portion of the light laterally of the car, is provided at the forward edge of the casing, being held in position by means of a frame 19 which may be held to the rear portion of the casing by screws or any other suitable fastening means. The upper portion of the frame is provided with a plurality of hinge members 21 adapted to cooperate with the hinge members 7 and when aligned with the eyes thereof to receive a pivot rod 22.

The construction described has in view the elimination of the usual pair of headlights positioned at the front of an automobile adjacent the radiator and the substitution therefor of the single large illuminating unit adjacent the upper portion of the plane of the windshield and the lighting of the road surface as well as the upper portion of the hood of the car by means of such single elevated illuminating unit. The combining of a plurality of bulbs in a single reflector assembly provides for more efficient lighting and the angular disposition of the rays is such that the roadway when illuminated will be free of the shadows which, with the present headlights, are often exaggerated and tend to show depressions where in fact there are none and which render night travel at speed somewhat unsafe. With the higher position of the lights the surface irregularities of the road will be seen in somewhat the same relief as when viewed in daylight.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

An apparatus of the character described having in combination a support positioned adjacent the under side of the roof of a motor car in the plane of the windshield, an elongated headlight unit pivotally secured at its upper front edge to said support and positioned behind the plane of the windshield, a pair of arcuate brackets and frictional locking members cooperating therewith for maintaining said unit in any desired position of angular adjustment, and means for moving said unit without altering said frictional adjustment.

Signed by me, this 26th day of August, 1927.

ARTHUR B. NOCK.